United States Patent [19]

Axthammer et al.

[11] Patent Number: 4,589,528
[45] Date of Patent: May 20, 1986

[54] DOUBLE-TUBE VIBRATION DAMPER

[75] Inventors: Ludwig Axthammer, Hambach; Felix Wössner, Schweinfurt, both of Fed. Rep. of Germany

[73] Assignee: Fichtel & Sachs AG, Schweinfurt, Fed. Rep. of Germany

[21] Appl. No.: 526,534

[22] Filed: Aug. 25, 1983

[30] Foreign Application Priority Data

Aug. 26, 1982 [DE] Fed. Rep. of Germany ....... 3231739

[51] Int. Cl.$^4$ ............................. F16F 9/50; F16F 9/46
[52] U.S. Cl. ..................................... 188/279; 188/299; 188/322.17; 251/12
[58] Field of Search ............... 188/268, 275, 279, 280, 188/299, 315, 322.16, 322.17, 322.22, 322.21, 285, 286, 287, 269, 283, 319; 267/113, 64.15, 64.21, 64.24; 251/12

[56] References Cited

U.S. PATENT DOCUMENTS

| | | | |
|---|---|---|---|
| 2,774,448 | 12/1956 | Hultin | 188/275 |
| 3,168,168 | 2/1965 | Chorkey | 188/287 |
| 3,421,544 | 1/1969 | Bozoyan | 251/12 X |
| 3,532,194 | 10/1970 | Jackson | 188/299 |
| 3,749,210 | 7/1973 | DeBaan | 188/315 X |
| 3,991,863 | 11/1976 | Lee | 188/315 X |
| 4,364,457 | 12/1982 | Wossner et al. | 188/322.17 |
| 4,469,315 | 9/1984 | Nicholls et al. | 188/299 X |

FOREIGN PATENT DOCUMENTS

| | | |
|---|---|---|
| 2911768 | 10/1980 | Fed. Rep. of Germany . |
| 0458895 | 12/1936 | United Kingdom . |
| 0942328 | 11/1963 | United Kingdom . |
| 1021877 | 3/1966 | United Kingdom . |
| 1185074 | 3/1970 | United Kingdom . |
| 1222806 | 2/1971 | United Kingdom . |
| 1229880 | 4/1971 | United Kingdom . |
| 1393808 | 5/1975 | United Kingdom . |

*Primary Examiner*—Bruce H. Stoner, Jr.
*Assistant Examiner*—Robert J. Oberleitner
*Attorney, Agent, or Firm*—Toren, McGeady, Stanger, Goldberg & Kiel

[57] ABSTRACT

In a double-tube vibration damper the working chamber adjacent the piston rod guide member is connected to the compensation chamber surrounding the cylinder through a by-pass valve. The by-pass valve is mounted in the cylinder or in a structural member stationary with respect to the cylinder. The by-pass valve has a cross-sectional area variable in dependency on a pressure signal or an electric signal. The damping characteristics of the vibration damper can be varied e.g. in dependency on the load charged onto the vehicle of which the vibration damper is a part.

31 Claims, 10 Drawing Figures

DOUBLE-TUBE VIBRATION DAMPER

SUMMARY OF THE INVENTION

The present invention is directed to a double-tube vibration damper particularly for use in a combination shock absorber spring unit comprising a cylinder member having an axis and two ends and defining a cavity therein;

a bottom valve unit adjacent a first end of said cylinder member;

a piston rod guide unit adjacent a second end of said cylinder member;

a piston rod member extending through said piston rod guide unit;

a piston unit connected to said piston rod member within said cavity, said piston unit dividing said cavity into a first working chamber adjacent said first end and a second working chamber adjacent said second end, said piston unit further comprising a piston valve unit interconnecting said first and second working chambers;

a container surrounding said cylinder and defining a compensation chamber in the annular space between said cylinder and said container, said compensation chamber being connected to said first working chamber through said bottom valve unit;

a body of liquid in said cavity;

a body of liquid and a body of gas within said compensation chamber.

Such double-tube vibration dampers are well known in the art.

From German 'Offenlegungsschrift' No. 2,911,768 a vibration damper is known, in which the working chambers on both sides of the piston are interconnected by a by-pass passage. In this by-pass passage there is provided a by-pass valve. This by-pass valve comprises a valve member which is actuated by an electric signal through an electromagnetic actuating device. The by-pass valve is located in the piston rod.

Moreover, vibration dampers are known which are conbined with gas springs and in which the increasing pressure of the gas spring resulting from an increased load is used to vary the damping action of the vibration damper. Also in this known system the by-pass valve is located in a hollow piston rod. The valve is actuated by an air-pressure signal through a membrane or a separating piston. The control of the damping characteristic is established by either controlling the cross-sectional area of the by-pass valve or by controlling the prestress of the valve springs of the piston valve unit.

The known constructions have disadvantages. One disadvantage is the expensive construction in view of connection lines, membranes, complicated valves and so on. Moreover, in the known constructions valve units must be used which are different from the valve system commonly used and easily available in the market. Moreover, the piston rods are generally weakened by the necessary recesses accommodating the by-pass valve and associated parts. This is particularly objectionable when transverse forces are to be transmitted through the piston rod. Such transverse forces occur if wheel guiding forces are to be transmitted through shock absorbers. Finally, the dimensions of the vibration damper are generally increased if a by-pass valve is provided within the piston rod.

It is an object of this invention to provide a vibration damper which avoids at least part of the above-mentioned disadvantages. A particular object of the invention is to provide a vibration damper with a variable damping force which is of simplified construction, less expensive than known constructions and comprises a by-pass valve unit easily to be assembled. A further object is to provide a vibration damper which can easily be housed at the location in which vibration dampers are usually mounted.

In view of at least one of these objects a double-tube vibration damper as defined above comprises a by-pass passage interconnecting the cavity and the compensation chamber. A by-pass valve unit within said by-pass passage is located in the cylinder or in a structural member stationary with respect to said cylinder in operation. The cross-sectional area of the by-pass valve unit is controllable by a pressure signal or an electric signal.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAIL DESCRIPTION OF THE DRAWING

Figure 1:
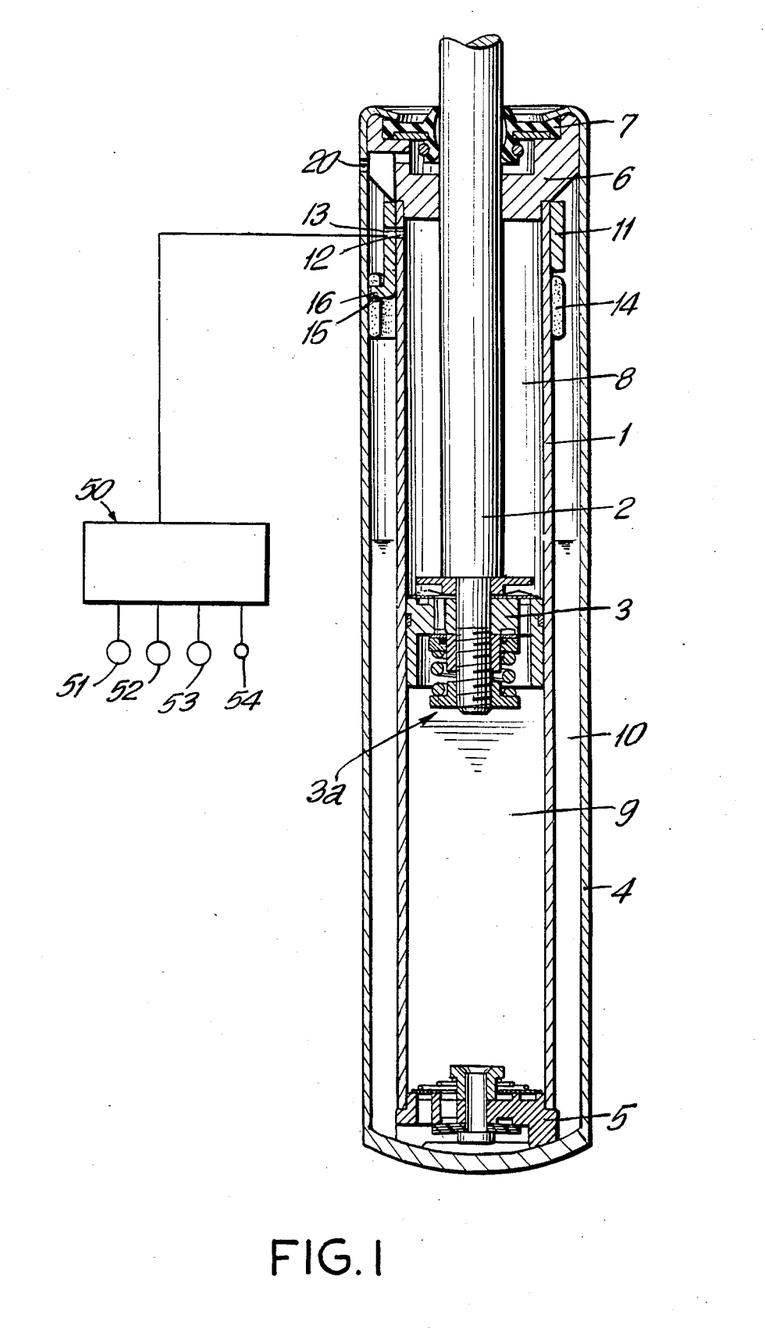
FIG. 1 shows a longitudinal section through a double-tube vibration damper where the by-pass valve is formed by a tubular or Bourdon spring.

The double-tube vibration damper as illustrated in FIG. 1 consists of a cylinder 1 filled with damping liquid, the interior of which is divided into the two working chambers 8 and 9 by a piston 3 connected with the piston rod 2 and comprising a piston valve unit 3a. The container 4 surrounds the cylinder 1, with spacing, the annular space thus formed constituting the compensation chamber 10. The cylinder 1 is centered in the container 4 by means of a bottom valve unit 5 and the piston rod guide unit 6, while the piston rod seal 7 seals off the interior of the vibration damper from the exterior. For the connection of the upper working chamber 8 with the compensation chamber 10, which is partially filled with damping liquid and partially with gas, the opening 12 is provided in the cylinder 1, and its cross-section is varied by a pressure-dependently acting control ring 11. Here as actuating device for the control ring 11 there serves a tubular or Bourdon spring 14 which is connected firmly by one end with the cylinder while the other end has an eyelet 15 in which there engages a radially directed projection 16 of the control ring 11. In dependency upon the pressure prevailing in the compensation chamber 10 the Bourdon spring 14 turns the control ring 11 and thus also the bore 13 of the control ring 11 in relation to the opening 12 in the cylinder wall, and thus achieves a variation of the through-flow cross-section. The pressure variation in the compensation chamber 10 is effected by a pressure source (not shown) which acts through the pressure medium connection 20, here represented as a bore, upon the compensation chamber 10 and thus also upon the Bourdon spring 14. The pressure variation in the compensation chamber 10 effects a variation of the radius of the Bourdon spring 14, whereby the control ring 11 with the bore 13 is rotated in relation to the opening 12 and thus a pressure-dependent variation of damping force occurs, since the by-pass valve formed by the control ring 11 and the opening 12 is effective in parallel with the valve units 3a, 5 in both the pulling and the pushing direction of the piston rod 2. The pressure variation supplied by way of the pressure medium connection 20 to the compensation chamber 10 for the actuation of the by-pass valve is substantially greater than the pressure fluctuations acting upon the compensation chamber 10 during damping operation.

It is to be noted that on downward movement of the piston rod 2 as shown in FIG. 1 the bottom valve unit 5 offers a high flow resistance to the damping liquid flowing from the working chamber 9 to the compensation chamber 10, while the piston valve unit 3a offers a relatively small flow resistance to the damping liquid flowing from the working chamber 9 to the working chamber 8. So in both working chambers 8 and 9 a high pressure is built up due to the increasing volume of the piston rod 2 within the cylinder 1. The liquid under high pressure can escape through the bottom valve unit 5 and the opening 12, the cross-sectional area of the opening 12 being variable in response to the pressure within the compensation chamber 10. The opening 12 is substantially in parallel with the bottom valve unit 5.

When the piston rod 2 is moved upwards as seen in FIG. 1 the piston valve unit 3a offers a relatively high flow resistance to the liquid flowing from the working chamber 8 to the working chamber 9. Liquid from the compensation chamber 10 can enter into the working chamber 9 through the bottom valve unit 5, the bottom valve unit 5 offering only small flow resistance to this latter flow of liquid. So the opening 12 is substantially parallel to the piston valve unit 3a. It results from the above that by decreasing the cross-sectional area of the opening 12 the damping effect of the vibration damper is increased both in the pulling and in the pushing direction. On the other hand, when the cross-sectional area of the opening 12 is increased the damping effect is decreased both in the pulling and the pushing direction The source of pressure connected to the pressure medium connection 20 offers a variable pressure in dependency e.g. of the load on the respective vehicle. So the damping effect may be increased if the load is increased and vice versa. This is desirable in view of preventing the suspension system of the vehicle to swing through the full stroke and come to abutment.

The increase of pressure within the compensation chamber 10 resulting from the source of pressure connected to the connection 20 may additionally increase the damping effect of the vibration damper. Generally, however, the pressure applied through the connection 20 is relatively small as compared with the pressure occurring in the working chambers 8 and 9 on movement of the piston rod.

Figures 2, 2A:
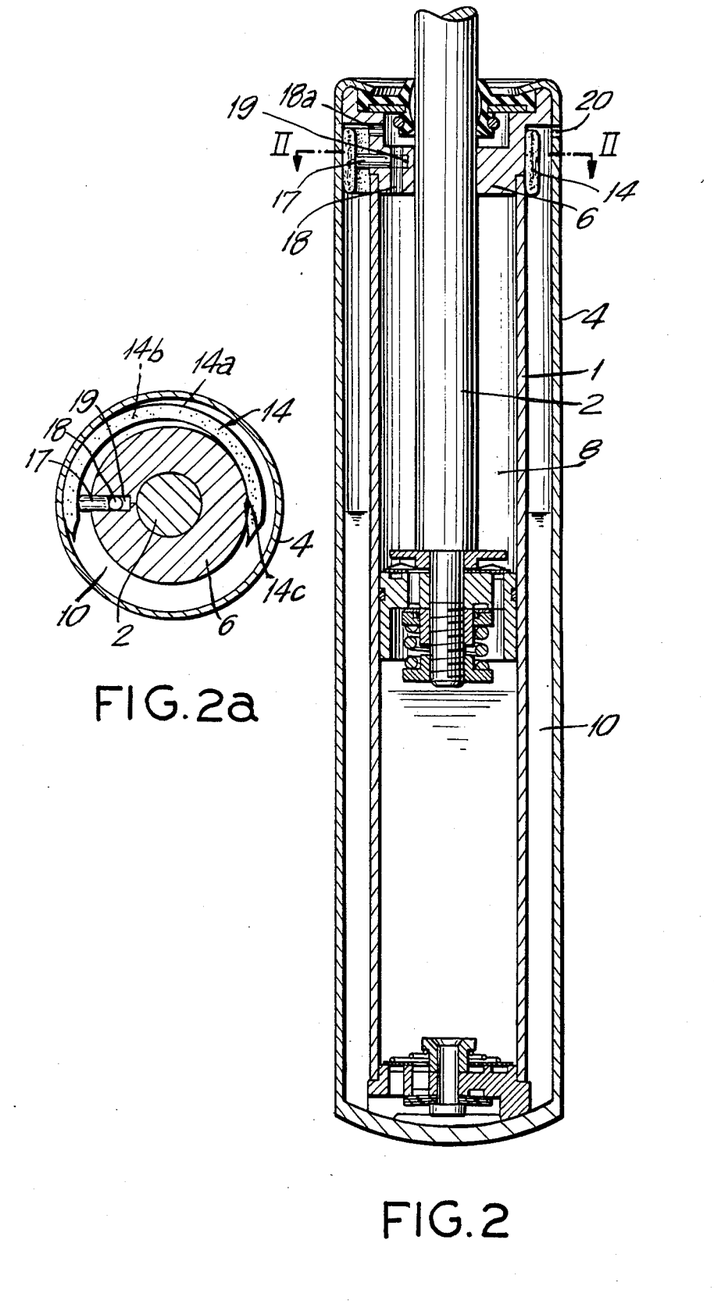
FIG. 2 shows a double-tube vibration damper with a by-pass valve of variable cross-section arranged in the piston rod guide unit.
FIG. 2a shows the cross-section according to line II-II of FIG. 2.

The form of embodiment according to FIG. 2 differs from that according to FIG. 1 essentially in that the by-pass valve is formed by an axial bore 18 situated in the piston rod guide unit 6 and connecting the working chamber 8 through a further passage 18a with the compensation chamber 10. In a radial bore 19 crossing the axial bore 18 a valve pin 17 is guided with is in operative connection with the free end of the Bourdon spring 14. The Bourdon spring 14 comprises a curved elongate housing 14a defining a chamber 14b therein. This chamber 14b is filled with a vacuum or with a gas. One end of the elongate housing is fixed to the piston rod guide unit 6 at 14c. The radius of curvature of the housing 14a is responsive to the pressure differential between the chamber 14b and the compensation chamber 10. So the position of the valve pin 17 is varied in dependency on the pressure within the compensation chamber 10, which pressure is again dependent on the pressure of the pressure source connected to the vibration damper at 20. The position of the valve pin 17 is responsible for the effective cross-sectional area of the axial bore 18.

It is to be noted that the Bourdon spring 14 of FIG. 1 is similar to the Bourdon spring 14 of FIG. 2. From FIG. 2a one can see that on variation of the pressure differential between the chamber 14b and the compensation chamber 10 the left-hand end of the housing 14a is moved in circumferential direction about the axis of the piston rod 2 and this circumferential movement effects in the embodiment of FIG. 1 the rotation of the control ring 11.

FIG. 1 shows in a diagrammatic way a signal generator 50 connected to the opening 13. This signal generator 50 is provided with a plurality of selectively operable sensors 51, 52, 53 and can also be actuated by a manual actuator 54.

In the embodiment of FIG. 2 the pressure medium required for the pressure-dependent control of the damping force is supplied through the pressure medium connection 20 to the compensation chamber 10 and the pressure-dependently variable damping force results due to displacement of the valve pin 17 in the radial bore 19 as a result of pressure-dependent variation of diameter of the Bourdon spring 14.

Figure 3:
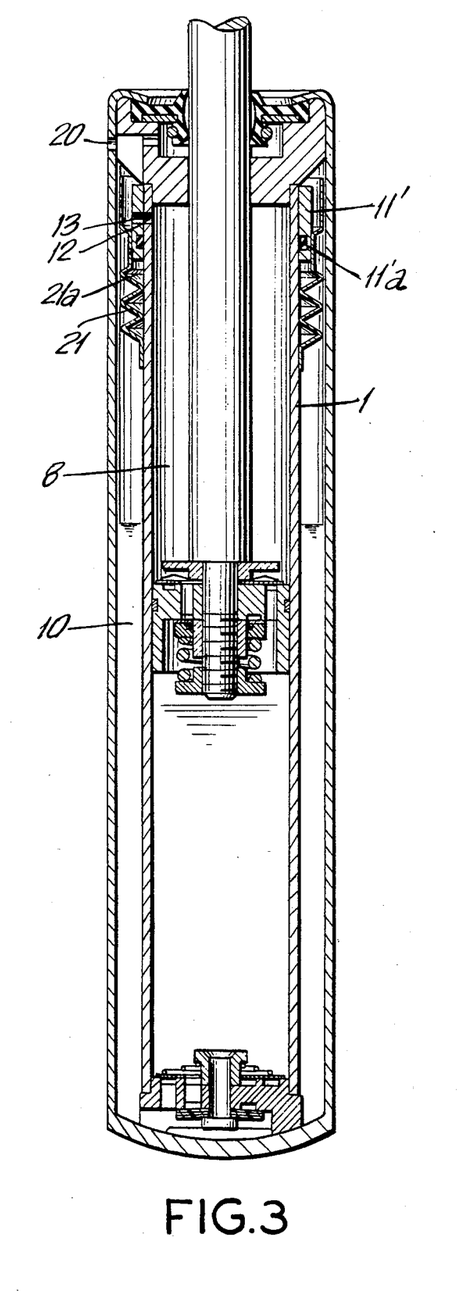
FIG. 3 shows the controlling of the by-pass valve by means of a metal bellows.

In the form of embodiment according to FIG. 3 the metal bellows 21 is firmly connected by the lower end with the outer face of the cylinder 1. The control ring 11' is also secured to the metal bellows 21, a sealed chamber 21a being defined by the bellows 21 the cylinder 1 and the control ring 11'. The control ring 11' is axially slidable along the cylinder 1 and a sealing element 11'a is provided between the cylinder 1 and the control ring 11'. The pressure variation in the compensation chamber 10, which takes place through the pressure medium connection 20 connected with the pressure source, effects an axial movement of the metal bellows 21, whereby the control ring 11' is displaced axially on the outer wall of the cylinder 1 and thus the throughflow cross-section between the opening 12 in the wall of the cylinder 1 and the bore 13 situated in the control ring 11' is varied in pressure dependence.

Figure 4:
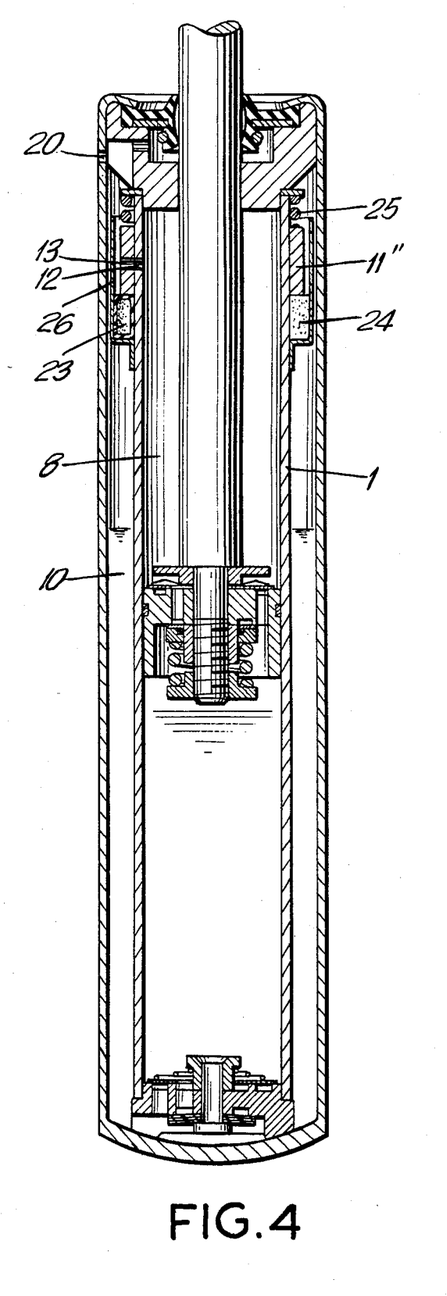
FIG. 4 shows the use of a hollow rubber spring for the cross-section-varying controlling of the by-pass valve.

In FIG. 4 there is shown a further form of embodiment for the pressure-dependent variation of the damping force. In this case on the outer wall of the cylinder 1 there is secured a mounting ring 26 which serves for the reception of a hollow rubber body formed of a caoutchouc or plastic material 23, represented in the left half of the drawing, or for the reception of a foam material ring 24 surrounded with an impermeable skin, as represented in the right half. The control ring 11" is also housed within the mounting ring 26. Since the hollow rubber body 23 or the foam material ring 24 can exert a force only in one direction upon the control ring 11", the latter is loaded on the other side by the spring 25. For the introduction of the control pressure into the working chamber 10 the pressure medium connection 20 is provided in the container, and an increase of pressure effects an axial compression of the hollow rubber body 23 or the foam material ring 24 and correspondingly the throughflow cross-section of the by-pass valve formed by the bore 13 and the opening 12 is reduced. Liquid is collected in the annular space between the control ring 11" and the mounting ring 26. The liquid passing through the openings 12, 13 enters into this volume of liquid so that foaming of the damping liquid leaving the opening 13 is largely suppressed.

Figure 5:
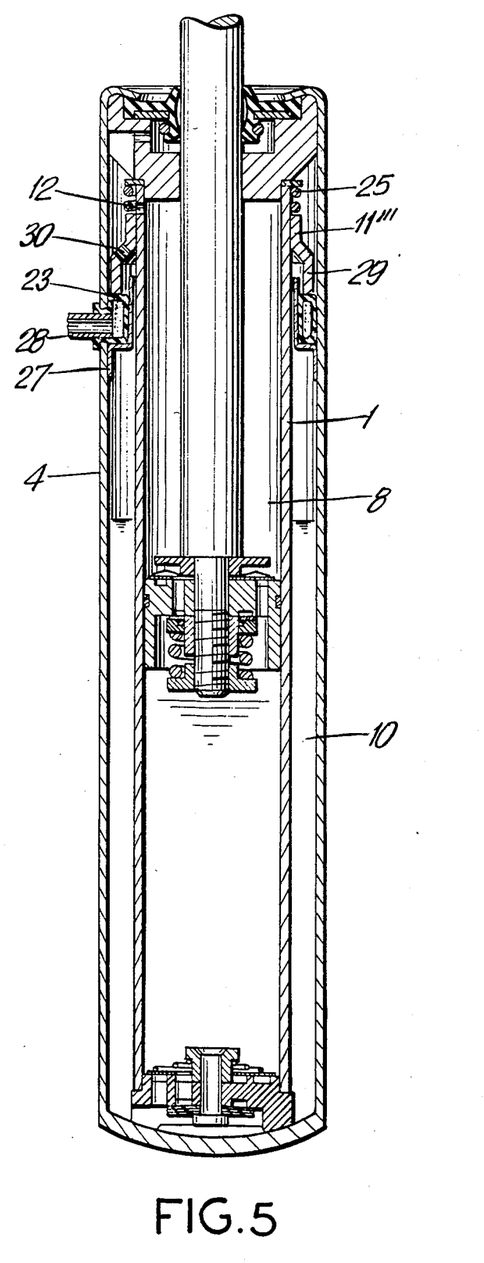
FIG. 5 shows a hollow rubber body arranged on the inner wall of the container and the interior of which is in communication directly through a conduit with a pressure source.

The form of embodiment according to FIG. 5 differs from that according to FIG. 4 essentially in that the mounting ring 27 is secured to the inner wall of the container 4 and the hollow rubber body 23 is provided with a pressure medium connection 28 which opens into the interior of the hollow rubber body 23. Pressure variation in the interior of the hollow rubber body 23 effects the axial movement of the control ring 111''', the upper edge of the control ring 111''' cooperating with the opening 12 in the wall of the cylinder 1. The spring 25 has the effect that the control ring 11''' constantly bears with its extension piece 29 of somewhat larger diameter on the end face of the hollow rubber body 23. In order to guarantee a satisfactory outflow of the liquid passing the by-pass valve from the working chamber 8 into the compensation chamber 10, the control ring 11''' is provided with at least one passage opening 30.

Figure 6:
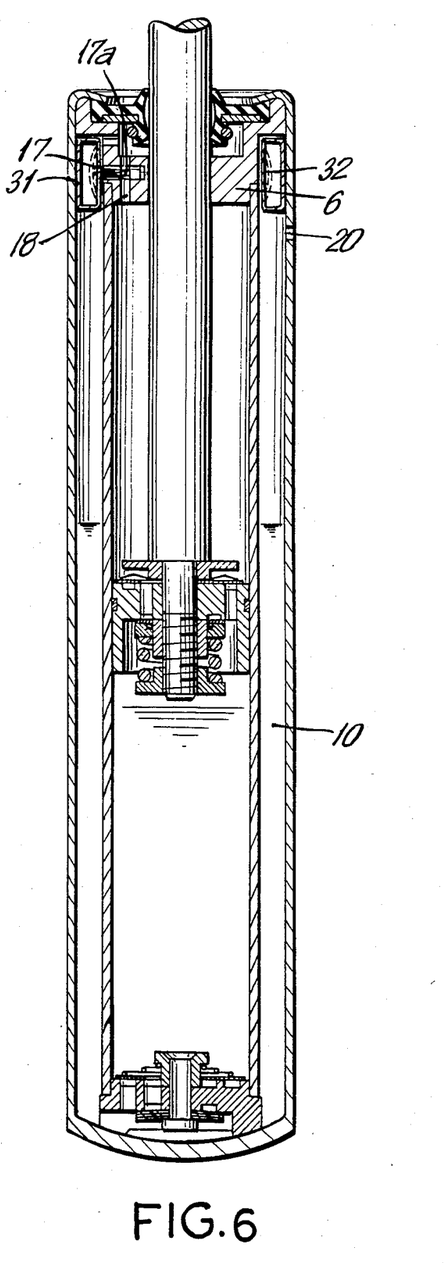
FIG. 6 shows the controlling of the by-pass valve by means of a hollow metal body.

In the form of embodiment as shown in FIG. 6 the pressure-dependently acting actuating device consists of a hollow body 31 of annular form, the inner wall of which is formed as a diaphragm 32. The by-pass valve is formed by the axial bore 18 situated in the piston rod guide unit 6 and by the valve pin 17 having a circumferential groove 17a which slides in a bore arranged transversely of the axial bore 18. A supply of pressure medium through the pressure medium connection 20 into the compensation chamber 10 has the effect that the diaphragm 32 assumes the position entered in chain lines. The circumferential groove 17a is displaced with respect to the axial bore 18 and thus the valve pin 17 reduces the cross-section of the bore 18, so that a rise occurs in the damping forces.

Figure 7:
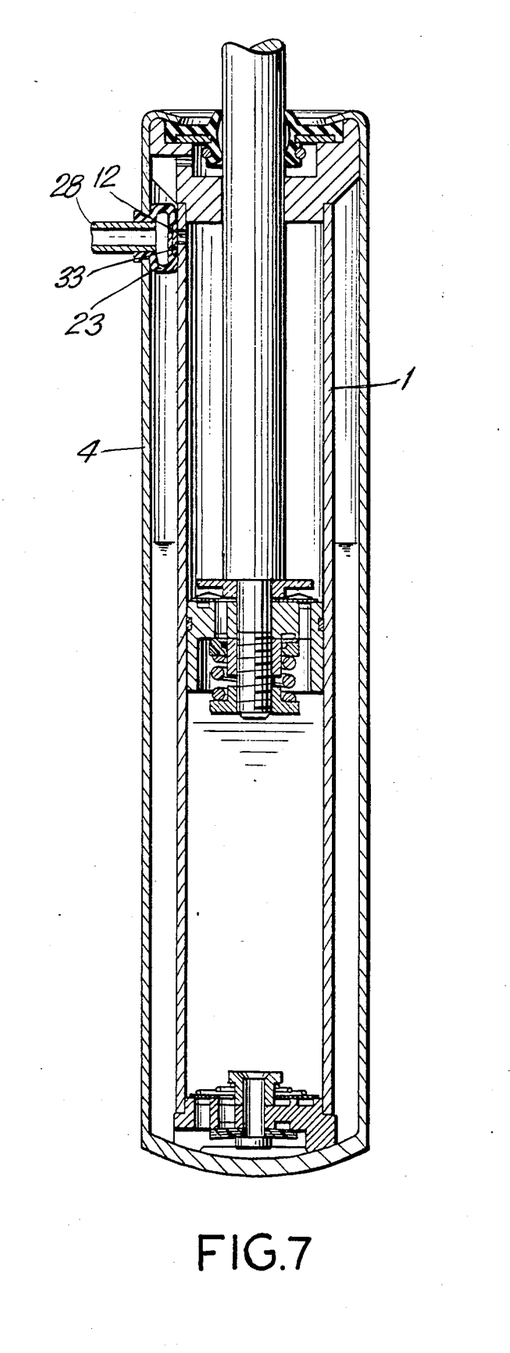
FIG. 7 shows a by-pass valve in which the opening in the cylinder wall is formed with a pressure-dependently acting valve plate.

FIG. 7 shows a form of embodiment in which the hollow rubber body 23 carries a valve plate 33 which is pressed by the internal pressure in the hollow rubber body against the opening 12 situated in the cylinder 1. The pressure medium is supplied to the interior of the hollow rubber body 23 through the pressure medium connection 28 secured in the wall of the containers 4. In this manner a pressure-dependent variation of cross-section is produced between the opening 12 and the valve plate 33.

Figure 8:
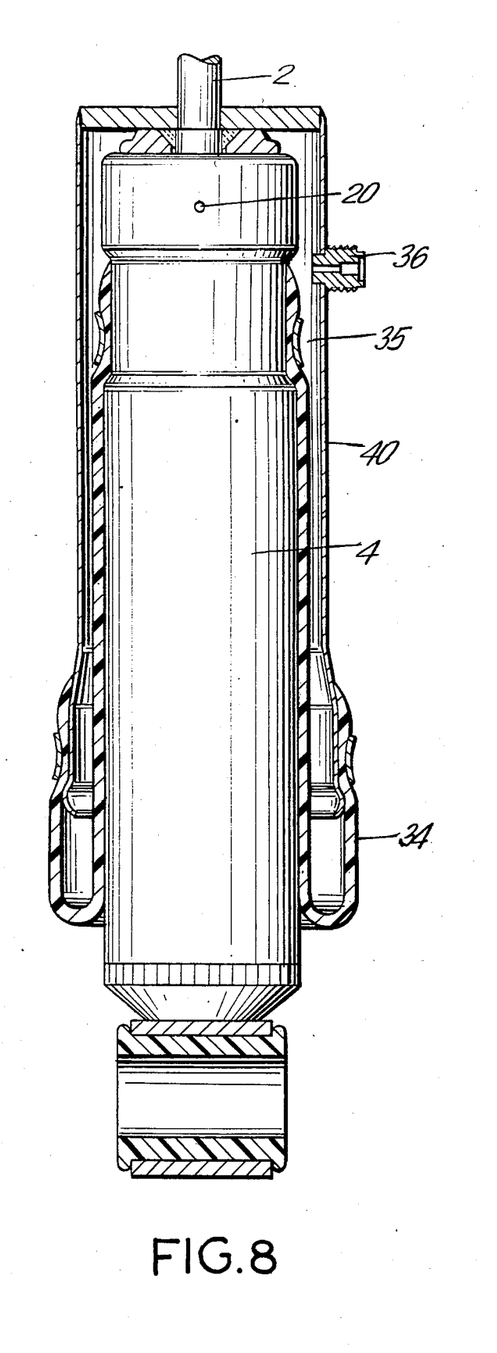
FIG. 8 shows a form of embodiment in which the vibration damper forms one constructional unit with a pneumatic spring.

A very simple variation of the damping force in dependency upon the wheel loading in obtained, as shown by FIG. 8, in that the vibration damper forms one structural unit with a pneumatic spring. The spring bellows 34 is secured on the one hand on the container 4 and on the other hand on the protective tube 40 of the vibration damper, and closes off the spring chamber 35 to the exterior. The protective tube 40 is movable with the piston rod 2 so that the volume of the spring chamber 35 is varied in response to movement of the piston rod 2, the volume being reduced on downward movement of the piston rod 2. Through the compressed-air connection 36 compressed air is supplied to or let off from the spring chamber 35, according to the state of loading of the vehicle. The compressed-air controlling takes place in accordance with the height position of the vehicle, that is to say on increasing of the loading, in order to achieve a midway position of the piston in the vibration damper, compressed air is admitted through the compressed-air connection 36 until this position is reached. The increase of pressure in the spring chamber 35 takes effect in the compensation chamber (not shown here) of the vibration damper, through the pressure medium connection 20, and in this way effects a load-dependent controlling for the damping force in that, as in the forms of embodiment as described above, the by-pass valve is controlled by the pressure variation. In order that the actuating device of the by-pass valve in the vibration damper may not be influenced appreciably, if at all, by pressure fluctuations which occur in the spring chamber 35 during driving, a delay member is provided between the spring chamber 35 and the compensation chamber of the vibration damper, consisting in that the bore 20 is formed as a small constricted bore.

Figure 9:
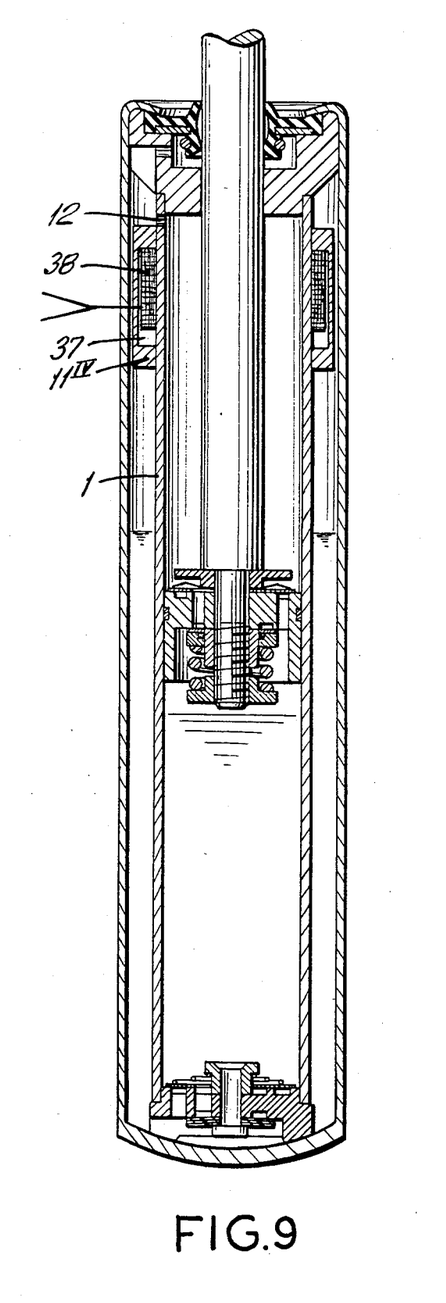
FIG. 9 shows a by-pass valve with an electromagnetic control system.

In FIG. 9 there is shown an electromagnetic controlling of the by-pass valve. In this case the control ring $11^{IV}$ comprising the cavity 37 is arranged on the outer wall of the cylinder 1. A coil 38 secured on the cylinder 1 is situated in this cavity 37. For magnetic controlling it is especially suitable to use what is called a linear magnet which effects a linear displacement of the control ring $11^{IV}$ according to the voltage applied, so that the opening 12 in the cylinder wall has a stepless variation of the passage cross-section by the control ring $11^{IV}$.

Referring once more to the embodiment of FIG. 8, it is also possible to connect the connection 20 with a pneumatic vehicle suspension separate from the shock absorber.

It is to be understood that the damping characteristic may also be varied voluntarily by the driver. So the driver may from the dash board send a pressure or electric signal to the respective vibration damper.

It is also possible to vary the damping characteristic by varying the by-pass cross-sectional area in dependency on the speed of the vehicle. It is further possible to vary the cross-sectional area of the by-pass in dependency upon the braking force in order to achieve a reduction in pitching under braking.

Further it is possible to vary the cross-sectional area of the by-pass in dependency of the spring force occurring in the vehicle springs which are not necessarily pneumatic springs.

It is also possible to vary the damping effect in dependency of a plurality of the above-mentioned or other parameters.

While specific embodiments of the invention have been shown and described in detail to illustrate the application of the inventive principle, it will be understood that the invention may be embodied otherwise without departing from such principle.

What is claimed is:

1. A double-tube vibration damper particularly for use in a combination shock absorber spring unit comprising
   a cylinder member having an axis and two ends defining a cavity therein;
   a bottom valve unit adjacent a first end of said cylinder member;
   a piston rod guide unit adjacent a second end of said cylinder member;
   a piston rod member extending through said piston rod guide unit;
   a piston unit connected to said piston rod member within said cavity, said piston unit dividing said cavity into a first working chamber adjacent said first end and a second working chamber adjacent said second end, said piston unit further comprising a piston valve unit interconnecting said first and second working chambers;
   a container surrounding said cylinder and defining a compensation chamber in the annular space between said cylinder and said container, said compensation chamber being connected to said first working chamber through said bottom valve unit;
   a body of liquid in said cavity;
   a body of liquid and a body of gas within said compensation chamber;
   a by-pass passage interconnecting said cavity and said compensation chamber;
   a by-pass valve unit controlling the cross-sectional area of said by-pass passage, said by-pass valve unit comprising an actuating device; said actuating device comprising a pressure element, said pressure element defining a pressure element chamber, said pressure element chamber having at least one wall movable in response to the pressure difference between the pressure element chamber and the surrounding atmosphere, the effective cross-sectional area of said by-pass passage being responsive to the position of said movable wall, said pressure element being housed within said compensation chamber, said pressure element chamber being hermetically closed with respect to said compensation chamber, a pressure source connected to said double-tube vibration damper controlling the pressure difference between the pressure element chamber and the surrounding atmosphere.

2. A double-tube vibration damper as set forth in claim 1, said by-pass valve unit interconnecting said second working chamber and said compensation chamber.

3. A double-tube vibration damper as set forth in claim 1, said by-pass valve unit comprising a substantially radial bore through said cylinder member and a valve member movable in response to said pressure signal in a direction substantially transverse to the direction of said bore and defining the effective cross-sectional area of said bore.

4. A double-tube vibration damper as set forth in claim 3, said valve member comprising a control ring, said control ring being movable in axial direction along said axis in response to said pressure signal.

5. A double-tube vibration damper as set forth in claim 3, said valve member comprising a control ring, said control ring being rotatable about said axis in response to said pressure signal.

6. A double-tube vibration damper as set forth in claim 1, said by-pass valve unit comprising an axial bore through said piston rod guide unit, one end of said bore communicating with said cavity, the other end of said bore communicating with said compensation chamber, a valve pin being movable within a substantially radial bore of said piston rod guide unit, said radial bore crossing said axial bore, said valve pin being radially movable in response to said pressure signal, the radial position of said valve pin defining the effective cross-sectional area of said by-pass passage.

7. A double-tube vibration damper as set forth in claim 1, said by-pass valve unit comprising a valve bore and a plate member opposite to one end of said valve bore, said plate member being movable in the axial direction of said valve bore in response to said pressure signal.

8. A double-tube vibration damper as set forth in claim 1, said pressure element comprising a hollow body made of flexible material and filled with a compressible mass.

9. A double-tube vibration damper as set forth in claim 8, said hollow body being an annular hollow body.

10. A double-tube vibration damper as set forth in claim 9, said annular hollow body being received by an annular receiving chamber within said compensation chamber, said annular receiving chamber being defined between one of said cylinder member and said container, and a mounting ring fixed to said cylinder member or said container, respectively, said receiving chamber being open in one axial direction, an annular valve member surrounding said cylinder member and being axially movable along said cylinder member, a radial bore in said cylinder member being more or less closed by said annular valve member in dependency on the axial position of said valve member, said valve member having two axial ends, one of said axial ends engaging said hollow body, the other of said axial ends engaging an axially acting spring element.

11. A double-tube vibration damper as set forth in claim 10, said hollow body being hermetically closed and subject to the pressure within said compensation chamber, said pressure within said compensation chamber being responsive to said pressure signal.

12. A double-tube vibration damper as set forth in claim 10, said pressure element chamber within said hollow body being connected to a pressure transmission line transmitting said pressure signal.

13. A double-tube vibration damper as set forth in claim 8, said flexible material being made of a plastics material.

14. A double-tube vibration damper as set forth in claim 8, said flexible material being made of a caoutchouc material.

15. A double-tube vibration damper as set forth in claim 1, said pressure element comprising a metal bellow.

16. A double-tube vibration damper as set forth in claim 15, said metal bellow surrounding said cylinder member on the radial outer side thereof and having two ends, a first end of said bellow being fixed and hermetically sealed to the outer side of said cylinder member, the second end of said bellow being fixed and hermetically sealed to an annular valve member, said annular valve member being slidably and sealingly mounted on the outer side of said cylinder member, said annular valve member cooperating with a radial bore of said cylinder member so as to vary the effective crosssection of said bore in accordance with the axial position of said valve member, said bellow being subject to the pressure within said compensation chamber, said pressure in said compensation chamber being responsive to said pressure signal.

17. A double-tube vibration damper as set forth in claim 1, said pressure element comprising a metallic housing.

18. A double-tube vibration damper as set forth in claim 17, said metallic housing being annular about said axis and having an outer wall fixed to the radially inner side of said container and a radially flexible, radially inner wall, said radially inner wall being subject to the pressure within said compensation chamber, the pressure in said compensation chamber being responsive to said pressure signal, said radially inner wall acting on a radially movable valve member 19. A double-tube vibration damper as set forth in claim 1, said pressure element being an elongate tubular element.

20. A double-tube vibration damper as set forth in claim 19, said tubular element having a curved shape, the radius of curvature being responsive to the pressure difference between the pressure element chamber and the surrounding atmosphere.

21. A double-tube vibration damper as set forth in claim 19, said tubular pressure element acting on an rotatable annular valve member of said by-pass valve unit.

22. A double-tube vibration damper as set forth in claim 19, said tubular pressure element acting onto a radially movable valve member of said by-pass valve unit.

23. A double-tube vibration damper as set forth in claim 1, said pressure signal being dependent on the load acting onto the spring suspension of a vehicle.

24. A double-tube vibration damper as set forth in claim 1, said vibration damper being integral with an air spring, said air spring being connected through a pressure conduit to said compensation chamber.

25. A double-tube vibration damper as set forth in claim 1, said pressure signal being derived from a signal generator arranged to be actuated by the driver of a vehicle.

26. A double-tube vibration damper as set forth in claim 1, said pressure signal being responsive to the speed of the respective vehicle.

27. A double-tube vibration damper as set forth in claim 1, said pressure signal being responsive to the brake force in the brake system of the respective vehicle.

28. A double-tube vibration damper as set forth in claim 1, said pressure signal being dependent on a plurality of parameters.

29. A double-tube vibration damper as set forth in claim 1, said pressure signal being transmitted to said by-pass valve unit through a delay member.

30. A double-tube vibration damper as set forth in claim 29, said delay member comprising a throttling bore.

31. A double-tube vibration damper particularly for use in a combination shock absorber spring unit comprising:
a cylinder member having an axis and two ends and defining a cavity therein;
a bottom valve unit adjacent a first end of said cylinder member;
a piston rod guide unit adjacent a second end of said cylinder member;
a piston rod member extending through said piston rod guide unit;
a piston unit connected to said piston rod member within said cavity, said piston unit dividing said cavity into a first working chamber adjacent said first end and a second working chamber adjacent said second end, said piston unit further comprising a piston valve unit interconnecting said first and second working chambers;
a container surrounding said cylinder and defining a compensation chamber in the annular space between said cylinder and said container, said compensation chamber being connected to said first working chamber through said bottom valve unit;
a body of liquid in said cavity;
a body of liquid and a body of gas within said compensation chamber;
a by-pass passage interconnecting said cavity and said compensation chamber;
a by-pass valve unit controlling the cross-sectional area of said by-pass passage, said by-pass valve unit comprising an actuating device;
said actuating device comprising a pressure element, said pressure element defining a pressure element chamber, said pressure element chamber having at least one wall movable in response to the pressure difference between the pressure element chamber and the surrounding atmosphere, the effective cross-sectional area of said by-pass passage being responsive to the position of said movable wall, said pressure element being housed within said compensation chamber, said pressure element cavity being hermetically closed, a pressure source connected to said double-tube vibrator damper controlling the pressure difference between the pressure element chamber and the surrounding atmosphere.

* * * * *